United States Patent [19]
Dirne et al.

[11] Patent Number: 5,301,418
[45] Date of Patent: Apr. 12, 1994

[54] METHOD OF MANUFACTURING A MAGNETIC HEAD

[75] Inventors: Franciscus W. A. Dirne; Adrianus P. Severijns; Jacobus B. Giesbers; Jacobus J. M. Ruigrok, all of Eindhoven, Netherlands

[73] Assignee: U.S. Philips Corporation, New York, N.Y.

[21] Appl. No.: 861,748

[22] Filed: Apr. 1, 1992

[30] Foreign Application Priority Data

Apr. 12, 1991 [XH] Hague ............... 91200859.6

[51] Int. Cl.⁵ .................................. G11B 5/42
[52] U.S. Cl. ......................... 29/603; 360/120
[58] Field of Search ........... 29/603; 360/119-122; 427/131, 132

[56] References Cited
U.S. PATENT DOCUMENTS 4,947,541  8/1990  Toyoda et al. ............ 29/603
5,042,140  8/1991  Coutellier et al. ........ 29/603
5,167,062  12/1992  Castera et al. ........... 29/603

FOREIGN PATENT DOCUMENTS 58-012119  4/1983  Japan .

OTHER PUBLICATIONS

IEEE Transactions on Magnetics; vol. 26, No. 5, Sep. 1990.

Primary Examiner—Carl E. Hall
Attorney, Agent, or Firm—John C. Fox

[57] ABSTRACT

A method of manufacturing one or more magnetic heads starts from a substrate (11) on which a first magnetic layer (13) is provided. A recess (15) is formed in this layer at the location of a transducing gap to be formed, after which a gap layer (19) is provided on a bounding wall (17) of the recess. Subsequently, the recess is filled with a second magnetic layer (23) and a counterblock (31) is provided on the layers after surface-polishing. Finally, a winding aperture is provided.

5 Claims, 5 Drawing Sheets

METHOD OF MANUFACTURING A MAGNETIC HEAD

BACKGROUND OF THE INVENTION

The invention relates to a method of manufacturing a magnetic head provided with a head face, a winding aperture and a transducing gap which extends in a height direction from the head face to the winding aperture and which, in the height direction, has a height which is equal to the distance between the head face and the winding aperture, said winding aperture having a dimension extending in a direction parallel to the height direction of the transducing gap and measured from the transducing gap to a bounding wall of the winding aperture, which wall, viewed in the height direction, is situated opposite the transducing gap, said method comprising the following steps: providing a first magnetic layer on a substrate, providing a recess in this layer, which recess extends as far as the substrate and in said height direction, providing a gap layer on a flank of the magnetic layer, which flank constitutes a boundary of the recess, subsequently providing a second magnetic layer in the recess and after surface-polishing, arranging a counterblock on the layers provided.

Such a method is suitable for manufacturing sandwich heads in large numbers. These are magnetic heads in which a thin magnetic layer is situated between two core limbs and in which a transducing gap extending as far as the head face is present in the magnetic layer.

A method as described in the opening paragraph is known from JP-A-63-234404 (herewith incorporated by reference). In the known method the recess is provided in the first magnetic layer throughout the dimension of the magnetic head in a direction parallel to the height dimension of the transducing gap. This ultimately results in a magnetic head in which a gap is also present in the rear yoke i.e. viewed from the head face, the part of the magnetic head situated behind the winding aperture, what has a negative influence on the efficiency of the magnetic head.

OBJECTIVES AND SUMMARY OF THE INVENTION

It is one of the objects of the invention to provide a method of manufacturing at least a magnetic head of the type described in the opening paragraph with the magnetic head or magnetic heads manufactured by means of the method, having a better efficiency than the known magnetic head manufactured by means of the known method.

To this end the method according to the invention is characterized in that the recess is provided in the first magnetic layer over a distance which is at least equal to the height of the transducing gap to be formed and which is at most equal to the sum of the height of the transducing gap to be formed and said dimension of the winding aperture to be formed, and in that the winding aperture is provided in the substrate, said layers and the counterblock. Since in this method the recess does not extend as far as the rear yoke, there will be no gap in the rear yoke so that the efficiency is better than in the case where a gap would be present in the rear yoke. In principle, it is sufficient if the distance over which the recess is provided is equal to the height of the transducing gap to be formed, but in practice this distance will be slightly larger in connection with manufacturing tolerances.

An embodiment of the method according to the invention in which several magnetic heads are manufactured simultaneously is characterized in that when the recess is provided a further recess contiguous to said recess is provided for forming a further magnetic head. As a result, only one joint recess is to be provided in the first magnetic layer for each pair of magnetic heads. Thus, this recess is twice as large as the recess for one magnetic head. It has been found that this larger recess can be provided in a simpler manner than two smaller recesses, i.e. one for each magnetic head.

To provide the transducing gap at a desired angle, referred to as the azimuth angle, with respect to the substrate, a further embodiment of the method according to the invention is characterized in that prior to providing the gap layer on the flank, the flank formed is finished by means of a focused ion beam. With this beam the flank, which will become a boundary of the transducing gap to be formed, is finished so that the angle between the flank and the substrate accurately corresponds to the desired azimuth angle.

An embodiment of the method according to the invention, in which an angle $\alpha$ which is larger than 0° and at most equal to 90° is present between the gap layer and the substrate, is characterized in that the second magnetic layer is formed from several sub-layers and in that an electric insulation layer is provided between the successive sub-layers, the layers being provided by means of sputtering, while the angle at which the insulation layer is sputtered is larger than 0° and at most equal to the angle $\alpha$, and the angle at which the sub-layers are sputtered is at least equal to the angle $\alpha$ and smaller than 180°. The magnetic sub-layers must extend as far as the gap layer, because otherwise the gap will be larger. For this purpose it is necessary that the sputtering angle is larger than or equal to the angle $\alpha$, because otherwise the sub-layers would not extend as far as the gap layer due to the shadow effect of the gap layer during sputtering. The insulation layer should extend at most as far as the gap layer but should not comprise a part which is parallel to the gap layer so as to prevent the formation of side gaps. For this purpose the sputtering angle must be equal to or smaller than the angle $\alpha$, because otherwise also a part which is parallel to the gap layer is formed on the gap layer or on a magnetic sub-layer.

For certain applications it is desirable to reduce the magnetically active part of the rear yoke so that the magnetical properties of the magnetic head change and are better adapted to these applications. However, in this case it is desirable to leave the overall dimensions of the magnetic head unmodified because the magnetic head is more difficult to handle when the dimensions are reduced. An embodiment of the method according to the invention, in which the rear yoke is reduced while the overall dimensions remain equal, is characterized in that prior to providing the counterblock the first magnetic layer is provided with a duct which extends as far as the substrate and which extends between two outer faces of the magnetic head after the magnetic head has been formed. This duct magnetically separates a part of the first magnetic layer from the rest of the layer so that the magnetically active part of the rear yoke is reduced. The duct is to be provided in such a way that it extends as far as the boundaries of the magnetic head when the magnetic head is cut so that the separated part is nowhere in contact with the rear yoke of the magnetic head.

The invention also relates to a magnetic head obtainable by the method according to the invention and to a magnetic head cluster obtainable by the method according to the invention, which magnetic head cluster comprises several magnetic heads. In scanners for use in, for example, video recorders or digital audio recorders (DAT recorders) magnetic heads are provided in groups in a window which is present in the drum wall of the rotatable drum section of the scanner. The magnetic heads associated with one group should be accurately positioned with respect to one another. In the known scanners this is effected by positioning each magnetic head separately in the window. The number of positioning steps can be reduced by using a magnetic head cluster in which the magnetic heads associated with a group form one assembly and by positioning the magnetic head cluster as a whole. For this purpose it is necessary that the transducing gaps of the separate magnetic heads of the cluster are exactly positioned with respect to one another. To obtain these mutual positions accurately, a magnetic head cluster which is manufactured by means of the method according to the invention is characterized in that the magnetic heads have a common substrate and a common first magnetic layer, an auxiliary layer being present between the substrate and the first magnetic layer of at least one of the magnetic heads. The auxiliary layer can be provided very accurately by means of the conventional techniques so that the mutual positions of the transducing gaps of the magnetic heads can be determined accurately.

An embodiment of the magnetic head cluster according to the invention is characterized in that the auxiliary layer has a thickness which is equal to the thickness of the first magnetic layer. As a result, the tracks written by the magnetic heads on the magnetic tape will substantially adjoin each other so that a great information density on the magnetic tape is obtained.

BRIEF DESCRIPTION OF THE DRAWING

The invention will now be described in greater detail by way of example with reference to an embodiment of the method according to the invention shown in the accompanying drawings in which.

DESCRIPTION OF THE PREFERRED EMBODIMENT

Figure 1:
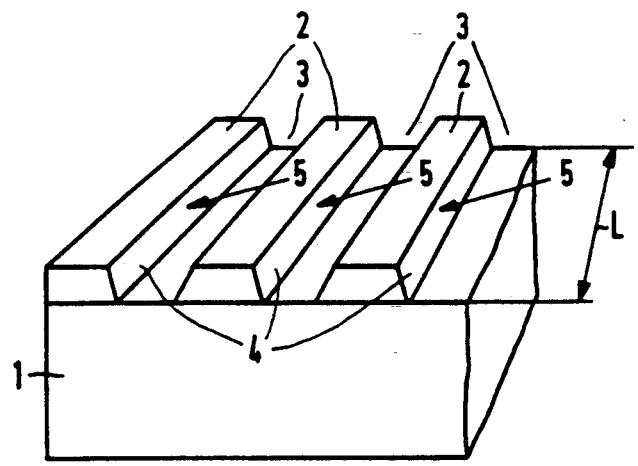
FIG. 1 shows an intermediate product during manufacture by means of a prior-art method.
Figure 2:
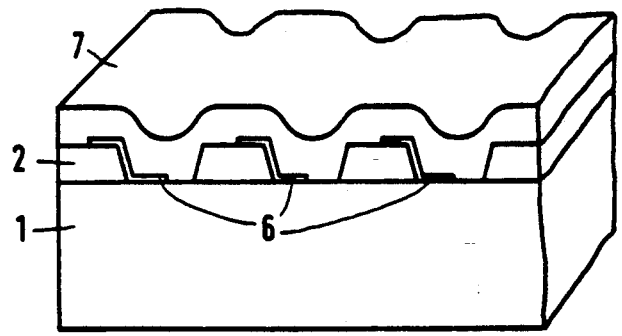
FIG. 2 shows a further intermediate product during manufacture by means of the prior-art method.
Figure 3:
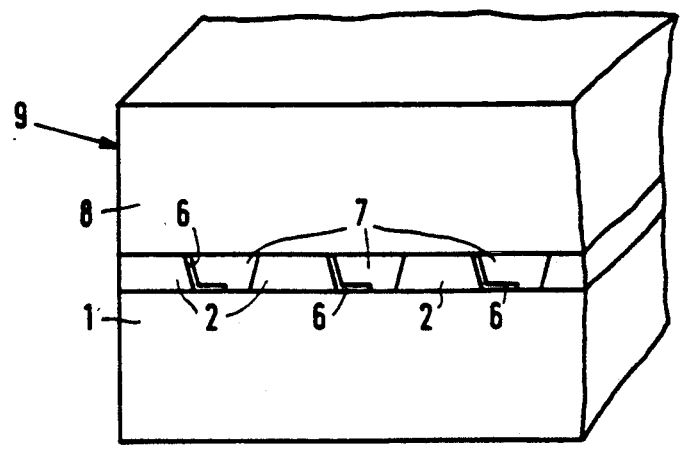
FIG. 3 shows a wafer manufactured by means of the prior-art method, from which wafer magnetic heads can be cut.

FIGS. 1, 2 and 3 show intermediate products during manufacture by means of a prior-art method. The known method starts from a non-magnetic substrate 1 on which a first magnetic layer 2 is provided. Recesses 3 are provided in this first magnetic layer 2 over a full dimension L of the substrate 1, see FIG. 1. Subsequently, a non-magnetic gap layer 6 is provided on a flank 4 of a bounding wall 5 of each recess 3 and then the recesses 3 are filled with a second magnetic layer 7, see FIG. 2. After the assembly has been surface-ground, a non-magnetic counterblock 8 is provided, see FIG. 3, and magnetic heads can be cut from the wafer 9 thus obtained. In this known method unnecessarily large recesses are provided so that a non-magnetic gap is formed also in the rear yoke of the magnetic head, which has a negative influence on the efficiency of the magnetic head.

Figure 4:
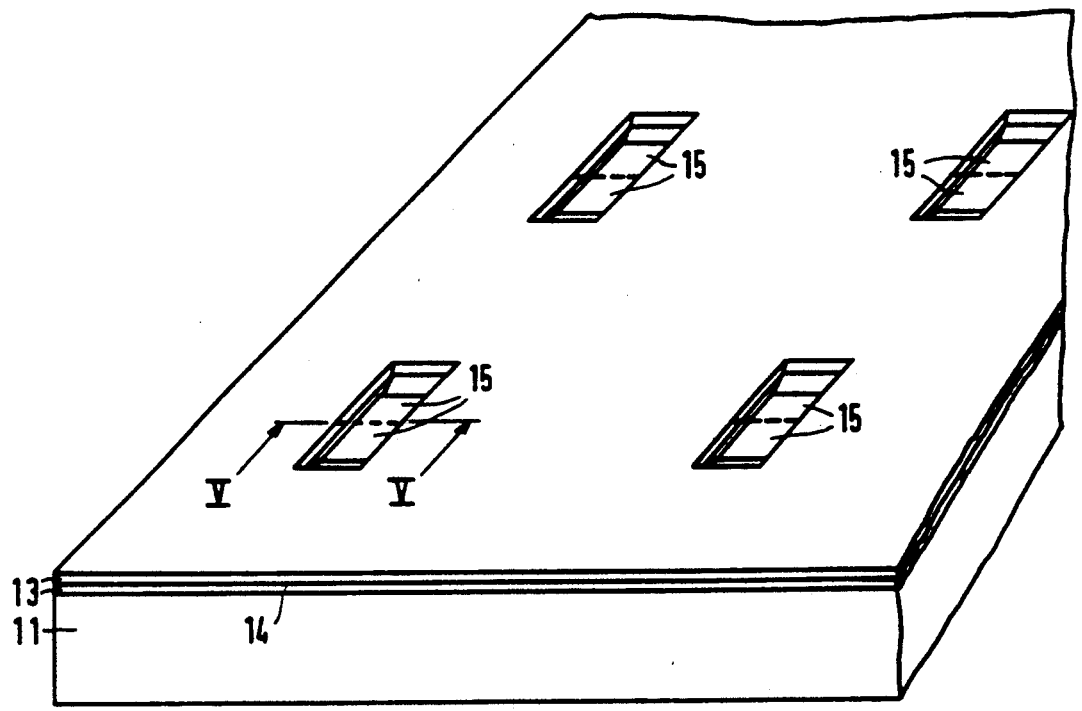
FIG. 4 shows an intermediate product during manufacture by means of a method according to the invention.
Figure 5A:
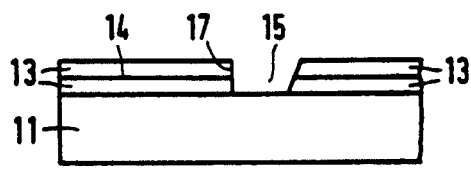
FIGS. 5A–5F show cross-sections of further intermediate products during manufacture by means of the method according to the invention.
Figure 5B:
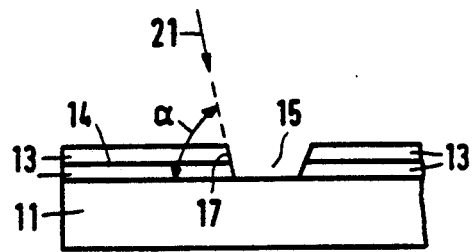
Figure 5C:
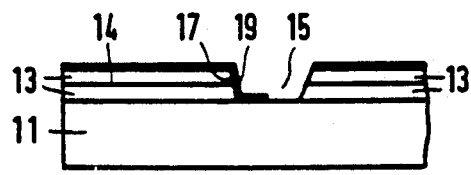
Figure 5D:
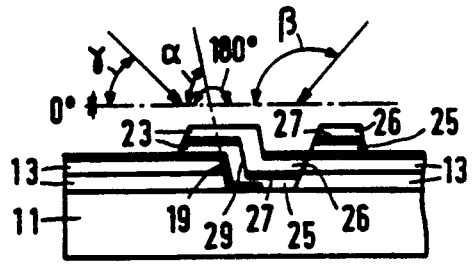
Figure 5E:
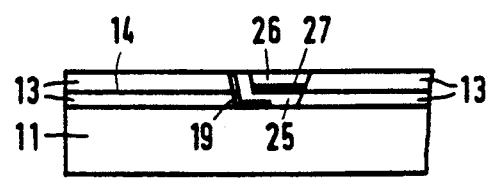
Figure 5F:
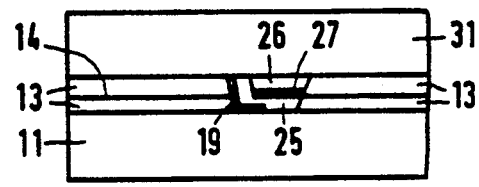

The method according to the invention will now be explained with reference to FIGS. 4 to 8. FIG. 4 shows a substrate 11 of, for example, $BaTiO_3$ on which a first magnetic layer 13 of, for example, CoNbZr comprising two sub-layers is provided. An electrically insulating layer 14 of, for example, $Al_2O_3$ or $SiO_2$ is provided between these sub-layers so as to prevent losses due to eddy currents. The layer 13 is provided with recesses 15 which extend as far as the substrate 11. The recesses 15 adjoin each other pair-wise and thus constitute a larger recess which can be provided in one process step. In this example the recesses 15 are provided in the layer 13 by means of a cutter. However, it is alternatively possible to provide the recesses in a different manner, for example, by means of a reactive ion etching process. FIG. 5A shows a cross-section at the location of one of the recesses 15. A gap layer 19 which is to form the transducing gap of the magnetic head is provided on one of the bounding walls 17 of the recess 15. This gap layer 19 is, for example, a layer of $SiO_2$. As the transducing gap must be at a certain angle $\alpha$ of, for example, 70° with respect to the substrate 11, the bounding wall 17 may have to be given a finishing treatment. The bounding wall 17 can be finished by means of a focused ion beam 21, see FIG. 5B, so that this wall will be at the correct angle $\alpha$ with respect to the substrate 11. This finishing treatment leads to a very smooth surface so that the very thin gap layer 19 can be provided without any problem. FIG. 5C shows in which way the gap layer is provided. The gap layer 19 is provided by means of sputtering. After the gap layer has been provided, the recess 15 is filled with a second magnetic layer 23. In this example this second magnetic layer 23 comprises two sub-layers 25 and 26 of, for example, CoNbZr with an electrically insulating intermediate layer 27 of, for example, $Al_2O_3$ or $SiO_2$ sandwiched between them. A first sub-layer 25 is provided at an angle $\beta$. This sub-layer 25 must extend as far as the gap layer 19 so that the angle $\beta$ at which sputtering takes place must be between the angle $\alpha$ and 180°. Subsequently, the electrically insulating intermediate layer 27 is sputtered. This intermediate layer 27 is generally also a magnetically insulating layer so that, in connection with unwanted side gap effects, it is undesirable that parts of this intermediate layer 27 extend parallel to the gap layer 19. By sputtering at an angle Γ, which angle Γ is between 0° and angle α, it is avoided that the intermediate layer 27 is provided on the flank 29 parallel to the gap layer 19 of the first sub-layer 25. Subsequently, the second sub-layer 26 of the second magnetic layer 23 is sputtered. By using an intermediate layer of magnetically conducting and electrically non-conducting material, for example, ferrite laminations instead of the non-magnetic intermediate layer 27, the intermediate layer can be sputtered at the same angle as the magnetic sub-layers 25 and 26. Subsequently, the assembly is surface-ground as far as the first magnetic layer 23, see FIG. 5E, and a counterblock 31 is provided, see FIG. 5F. This counterblock may be made of the same material as the substrate, for example, BaTiO$_3$. The wafer obtained in this manner is provided with winding apertures, whereafter the magnetic heads can be cut from the wafer.

Figure 6:
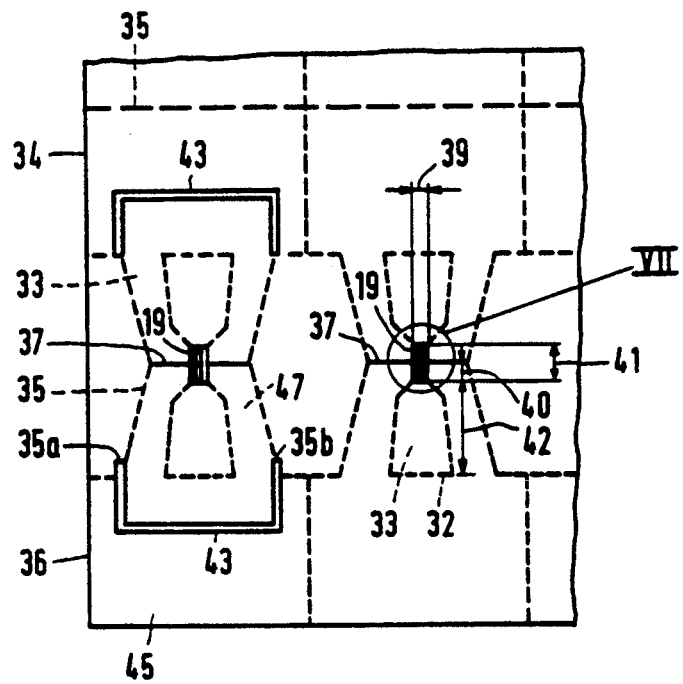
FIG. 6 is a plan view of an intermediate product.

In a plan view of the intermediate product according to FIG. 5C, FIG. 6 shows by means of broken lines the future positions of the winding apertures 33 and the future contours 35 of the magnetic heads. Each gap layer 19 formed in the manner described above constitutes two transducing gaps of two magnetic heads 34 and 36 whose head faces 37 adjoin each other. The transducing gap of one single magnetic head extends in the height direction from the head face 37 to the winding aperture 33 and has a height 40 in the height direction which is equal to the distance between the head face and the winding aperture. The winding aperture 33 has a dimension 42 in a direction parallel to the height direction of the transducing gap and measured from the transducing gap to a bounding wall 32 of the winding aperture 33, which wall is situated opposite the transducing gap in the height direction. The winding apertures 33 are provided and the magnetic heads 34, 36 are cut by means of, for example, a laser. This has the advantage that a smooth surface is obtained which need not be finished or has to be minimally finished. The dimensions 39, 41 of the recesses 15 are 20 and 100 μm, respectively, in this example.

If a magnetic head having a smaller magnetic yoke is desired, a duct 43 is provided in the first magnetic layer 13, for example, by means of a laser or by etching, and this is done before the counterblock is provided. This duct 43 should extend between two boundaries 35a, 35b of the magnetic head 34, 36 to be formed. After the magnetic head has been cut, the duct 43 separates the rear part 45 of the first magnetic layer 13 from the front part 47 so that this rear part 45 does not take part in the guidance of magnetic flux. Due to this duct 43 a magnetic head having a smaller magnetic yoke is obtained in a simple manner, while the dimensions of the magnetic head are unmodified, which does not have a detrimental influence on its ease of handling.

Figure 7:
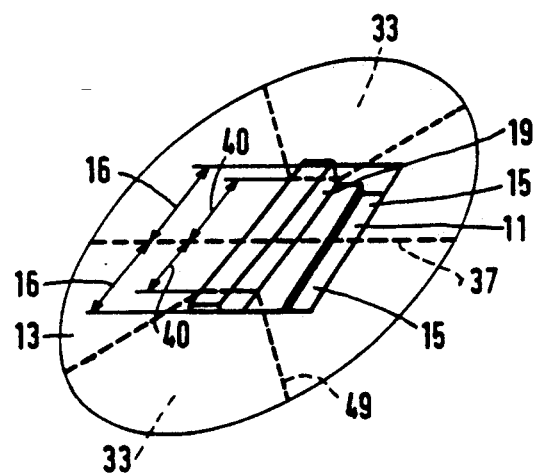
FIG. 7 shows a detail of the intermediate product shown in FIG. 6.

FIG. 7 shows a detail of the substrate 11 carrying the first magnetic layer 13 and the gap layer 19 at the location of a recess 15. The contour shown by means of a broken line 37 of the head faces or tape contact faces to be formed also indicates the boundary of the two recesses 15. This detail corresponds to the intermediate product shown in FIG. 5C. The Figure shows that each recess 15 is provided over a larger distance 16 than the height 40 of the transducing gap to be formed and that it extends into the winding aperture 33 to be formed, whose contours are illustrated by means of the broken line 49. This is to ensure that the gap layers 19 actually extend as far as the winding apertures 33. In fact, if the gap layer 19 and the winding aperture 33 are spaced apart, i.e. if a strip of the first magnetic layer 13 is present between the gap layer 19 and the winding aperture 33, this strip will short-circuit the magnetic yoke so that substantially all the magnetic flux is guided through this strip and does not cross over at the area of the gap layer 19, which renders the magnetic head unusable.

Figure 8:
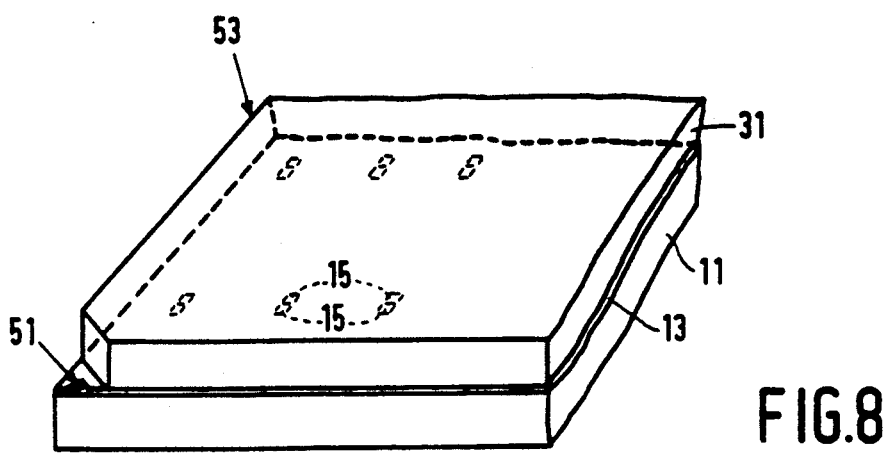
FIG. 8 shows a wafer manufactured by means of the method according to the invention, from which wafer magnetic heads can be cut.

As already noted, a laser is preferably used to provide the winding apertures 33 and to cut the magnetic heads 34, 36. By providing the first magnetic layer 13 also with a reference 51 when the recesses 15 are provided in the first magnetic layer 13, it can exactly be determined during laser cutting where the gap layers are located, hence where the winding apertures and the magnetic head contours must be formed. FIG. 8 shows a wafer 53 having such a reference 51. The broken lines indicate the recesses 15 in the first magnetic layer 13. In this way the magnetic heads can be cut from the wafer 53 with very great accuracy.

Figure 9:
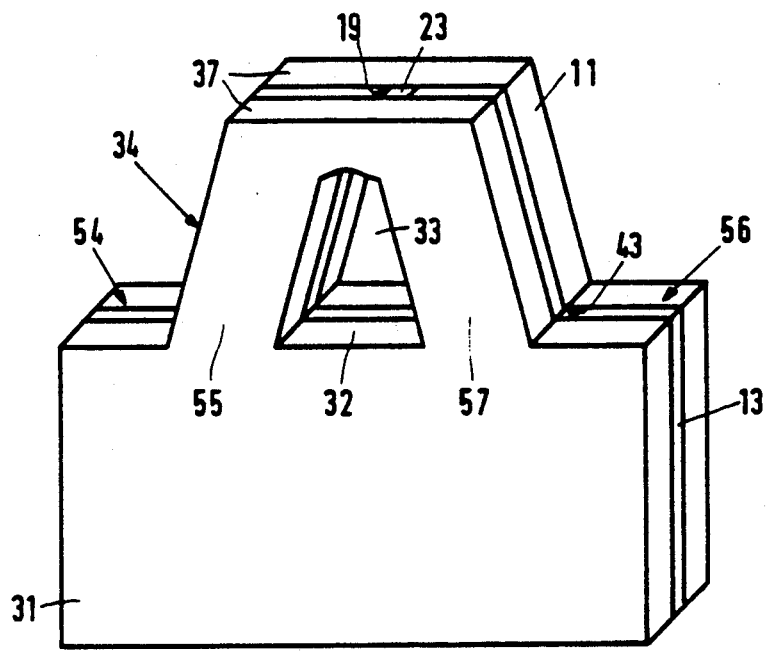
FIG. 9 shows a magnetic head manufactured by means of the method according to the invention.

FIG. 9 shows a complete sandwich head 34 manufactured in the manner described above. The first magnetic layer 13 is present between the substrate 11 and the counterblock 31. The second magnetic layer 23 is present proximate to the transducing gap which is formed by the gap layer 19. In this embodiment the magnetic layers of the magnetic head 34 are formed from one sub-layer. The head face or contact face 37 is provided with a profile so as to ensure better contact with a magnetic recording medium. Finally, a coil must be provided around at least one of the yoke limbs 55 and 57 and through the winding aperture 33. The winding aperture is bounded by the bounding wall 32 at the side facing the transducing gap. The first magnetic layer 13 is further provided with a duct 43 in the same way as is shown in FIG. 6. This duct may be filled with a magnetically insulating material, for example, glass and extends between two outer faces 54 and 56 of the magnetic head.

Figure 10:
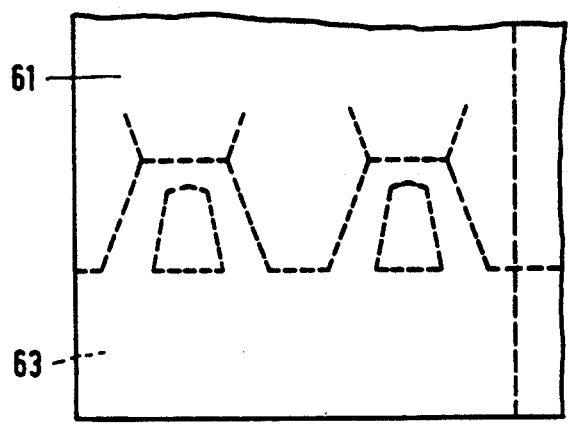
FIG. 10 shows a further wafer manufactured by means of the method according to the invention, from which wafer magnetic head clusters can be cut.
Figure 11:
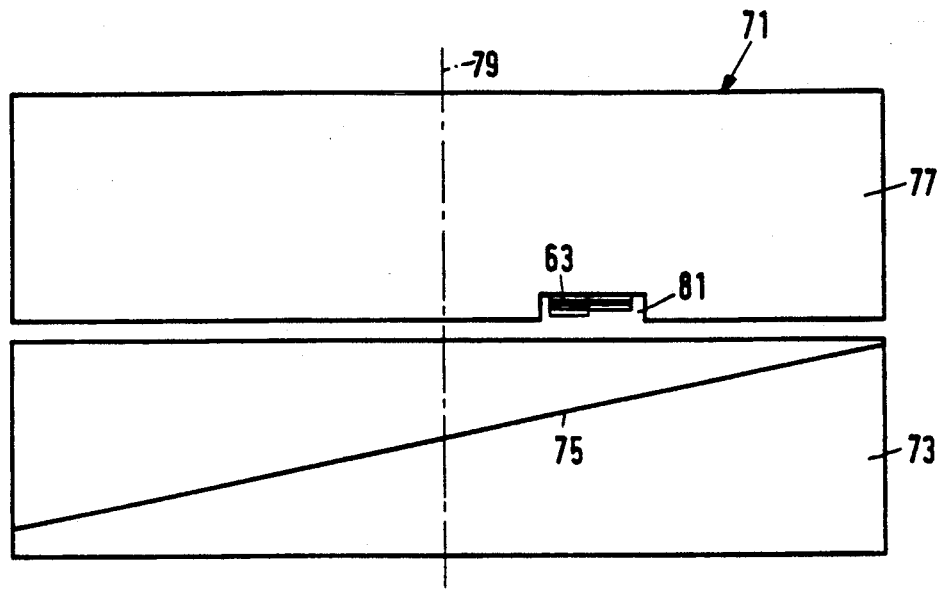
FIG. 11 shows a scanner provided with a magnetic head cluster manufactured by means of the method according to the invention.
Figure 12:
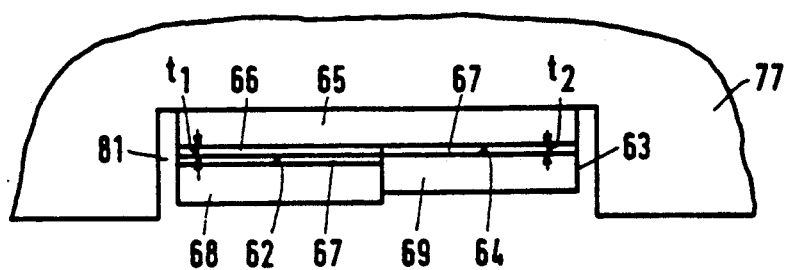
FIG. 12 shows a detail of the head cluster window of the scanner shown in FIG. 11.

Magnetic head clusters can also be manufactured in a simple manner by means of the method described above. FIG. 10 shows a wafer 61 comprising a substrate and a counterblock with magnetic layers and a gap layer sandwiched between them. Instead of separate magnetic heads, magnetic head clusters 63 comprising several magnetic heads are now cut from the wafer 61. Such a magnetic head cluster 63 is eminently suitable for use in a rotatable scanner FIG. 11 shows such a scanner 71 which is often used in video recorders or digital audio recorders (DAT recorders). The scanner 71 comprises a stationary lower drum 73 which is provided with a tape guide ruler 75 and an upper drum 77 which is rotatable about axis 79. The upper drum 77 has a window 81 accommodating the magnetic head cluster 63. The transducing gaps of the magnetic heads associated with one cluster 63 must be positioned accurately with respect to each other. By using magnetic head clusters only one positioning step is to be performed for each magnetic head cluster so as to position all magnetic heads associated with the cluster. FIG. 12 shows a detail of the upper drum 77 proximate to the window 81. The magnetic head cluster 63 comprises a substrate 65 half of which is covered by an auxiliary layer 66. This auxiliary layer and the other half of the substrate carry a magnetic layer 67. Transducing gaps 62 and 64 each associated with a magnetic head of the cluster are formed in the magnetic layer. Counterblocks 68 and 69 are provided on the magnetic layer 67. Due to this structure the transducing gaps 62 and 64 are exactly positioned with respect to each other. It is often desirable that the distance between the transducing gaps in the direction of the axis 79 is zero. This can be accurately achieved by rendering the thickness $t_1$ of the auxiliary later 66 equal to the thickness $t_2$ of the magnetic layer 67.

It is to be noted that the invention is not limited to the embodiments shown in the drawings. The invention can also be used for embodiments deviating from the drawings which are within the scope defined by the Claims.

We claim:

1. A method of manufacturing a magnetic head provided with a head face, a winding aperture and a transducing gap which extends in a height direction from the head face to the winding aperture and which, in the height direction, has a height which is equal to the distance between the head face and the winding aperture, said winding aperture having a dimension extending in a direction parallel to the height direction of the transducing gap and measured from the transducing gap to a bounding wall of the winding aperture, which wall, viewed in the height direction, is situated opposite the transducing gap, said method comprising the following steps:

providing first magnetic layer on a substrate, providing a recess in said layer, which recess extends as far as the substrate and in said height direction, providing a gap layer on a flank of the magnetic layer, which flank constitutes a boundary of the recess, subsequently providing a second magnetic layer in the recess and after surface-polishing, arranging a counterblock on the layers provided, characterized in that the recess is provided in the first magnetic layer over a distance which is greater than the height of the transducing gap to be formed and which is at most equal to the sum of the height of the transducing gap to be formed and said dimension of the winding aperture to be formed, and in that the winding aperture is provided in the substrate, said layers and the counterblock.

2. A method as claimed in claim 1, in which several magnetic heads are manufactured simultaneously, characterized in that when the recess is provided a further recess contiguous to said recess is provided for forming a further magnetic head.

3. A method as claimed in claim 1, characterized in that prior to providing the gap layer on the flank, the flank formed is finished by means of a focused ion beam.

4. A method as claimed in claim 1, characterized in that prior to providing the counterblock the first magnetic layer is provided with a duct which extends as far as the substrate and which extends between two outer faces of the magnetic head after the magnetic head has been formed.

5. A method of manufacturing a magnetic head provided with a head face, a winding aperture and a transducing gap which extends in a height direction, has a height which is equal to the distance between the head face and the winding aperture, said winding aperture having a dimension extending in a direction parallel to the height direction of the transducing gap and measured from the transducing gap to a bounding wall of the winding aperture, which wall, viewed in the height direction, is situated opposite the transducing gap, said method comprising the following steps:

providing a first magnetic layer on a substrate, providing a recess in said first magnetic layer, which recess extends as far as the substrate and in said height direction, providing a gap layer on a flank of said first magnetic layer, which flank constitutes a boundary of the recess, subsequently providing a second magnetic layer in the recess and after surface-polishing, arranging a counterblock on the layers provided, characterized in that the recess is provided in said first magnetic layer over a distance which is greater than the height of the transducing gap to be formed and which is at most equal to the sum of the height of the transducing gap to be formed and said dimension of the winding aperture to be formed, that the winding aperture is provided in the substrate, said layers and the counterblock, an angle $\alpha$ which is larger than 0° and at most equal to 90° is present between the gap layer and the substrate, said second magnetic layer is formed from several sub-layers with an electric insulation layer provided between successive sub-layers, providing said sub-layers by sputtering at an angle at least equal to the angle $\alpha$ and less than 180° and providing said insulation layer by sputtering at an angle larger than 0° and at most equal to the angle $\alpha$.

* * * * *